(12) United States Patent
Roth et al.

(10) Patent No.: US 9,083,749 B1
(45) Date of Patent: Jul. 14, 2015

(54) MANAGING MULTIPLE SECURITY POLICY REPRESENTATIONS IN A DISTRIBUTED ENVIRONMENT

(71) Applicant: Amazon Technologies, Inc., Reno, NV (US)

(72) Inventors: Gregory Branchek Roth, Seattle, WA (US); Kevin Ross O'Neill, Seattle, WA (US); Brian Irl Pratt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 456 days.

(21) Appl. No.: 13/654,111

(22) Filed: Oct. 17, 2012

(51) Int. Cl.
*G06F 21/60* (2013.01)
*H04L 29/06* (2006.01)

(52) U.S. Cl.
CPC ....................................... *H04L 63/20* (2013.01)

(58) Field of Classification Search
CPC ................................. G06F 21/60; H04L 63/20
USPC ............................................................ 726/1
See application file for complete search history.

(56) References Cited

U.S. PATENT DOCUMENTS

| | | | |
|---|---|---|---|
| 5,968,176 A * | 10/1999 | Nessett et al. | 726/11 |
| 7,308,702 B1 * | 12/2007 | Thomsen et al. | 726/1 |
| 8,255,972 B2 * | 8/2012 | Azagury et al. | 726/1 |
| 8,464,335 B1 * | 6/2013 | Sinha et al. | 726/13 |
| 8,621,594 B2 * | 12/2013 | Fenton et al. | 726/12 |
| 2008/0209506 A1 * | 8/2008 | Ghai et al. | 726/1 |
| 2010/0217850 A1 * | 8/2010 | Ferris | 709/223 |
| 2013/0019002 A1 * | 1/2013 | Heileman et al. | 709/223 |

* cited by examiner

*Primary Examiner* — William Powers
(74) *Attorney, Agent, or Firm* — Hogan Lovells US LLP

(57) ABSTRACT

Customers accessing resources or services in a distributed environment can obtain assurance that a provider of that environment will only allow requests to access those resources or services when those requests satisfy at least one security policy associated with the customer. A customer can provide a security policy update that might be written in a different representation (e.g., version) than is supported by all relevant policy evaluation engines across the distributed environment. A component or service such as an access management service can evaluate the representation of the policy, as well as the representations supported by the evaluation engines, and can determine if the features of the policy update are supported by the representations of the engines. If so, the policy update can be translated to express the policy document in the supported representation(s), such that the policy can be utilized without having to update the relevant engines.

30 Claims, 5 Drawing Sheets

MANAGING MULTIPLE SECURITY POLICY REPRESENTATIONS IN A DISTRIBUTED ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, customer or provider can utilize one or more security policies that can be used to indicate which requests requiring access to those resources should be allowed, and which should be denied. Various security policy languages can be used to generate these policies, and appropriate evaluation engines can be used to apply these polices for requests to specific resources or services. A potential difficulty arises, however, in the fact that the policy languages can be updated or extended over time, or different representations of those policies can be generated. In order to support these changes using conventional approaches, the engines that are to support each update, version, or different representation must be updated accordingly. In a distributed system where there can be many different engines in many different locations, this can be difficult to manage and/or ensure. Further, not having the proper engine in a particular location can result in requests being improperly denied because the engine is not able to properly evaluate the policy for the respective resources and/or services.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to resources and/or services in a distributed environment. In particular, various embodiments enable multiple versions or other representations of security policies (e.g., access control policies) to be supported through the translation of these representations to one or more representations that are supported by the respective policy evaluation engines or other such components. A policy evaluation engine can include hardware and/or software configured to take information from a request and from one or more corresponding policy documents and determine how to handle the request, such as whether to allow, deny, or audit the request. In at least some embodiments, a customer can submit a security policy to an entity such as an access management service, which can cause that security policy to be available to one or more evaluation engines that can use that security policy to determine whether to allow or deny access to resources or services associated with that customer. The resources and/or services can be located at various locations across a distributed environment, and one or more evaluation engines can be utilized for at least some of these locations. When receiving a security policy, the access management service can determine a language, version, and/or other representation aspect of the security policy, and can compare this, in at least some embodiments, against a language, version, and/or other representation supported by one or more evaluation engines that will be tasked with enforcing that security policy. The access management service then can translate the security policy to at least one representation that is supported by those evaluation engines. This can include, for example, translating the security policy to an earlier version of the security policy language, which can support similar functionality but with potentially more complex constructs. The security policy representation(s) then can be sent to locations where the representations are accessible to the respective evaluation engine(s). The security policy representations can be applied to various resources or components in the distributed environment, as may include buckets, queues, data stores, processing components, servers, virtual machines, or other such components.

Various other applications, processes, and uses are presented below with respect to the various embodiments.

Figure 1:
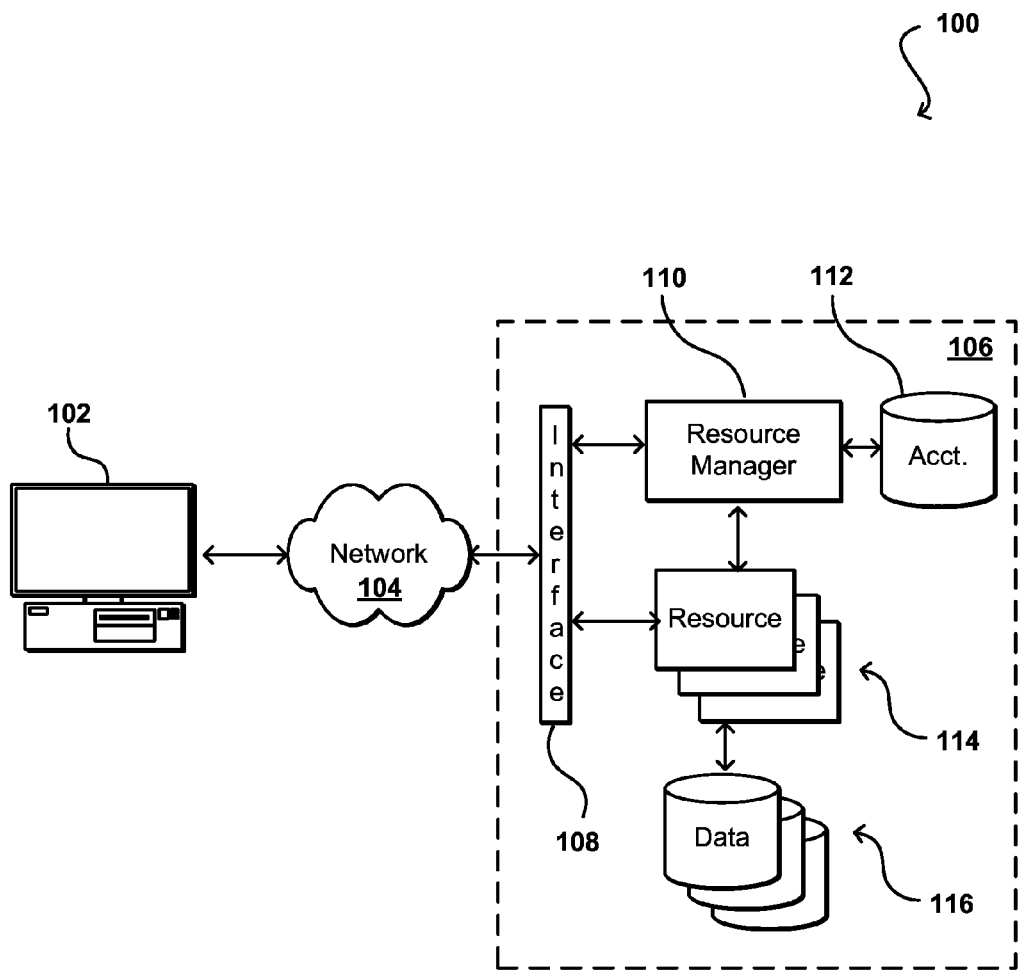
FIG. 1 illustrates an example environment in which various embodiments can be implemented.

FIG. 1 illustrates an example environment 100 in which aspects of the various embodiments can be implemented. In this example a customer of a multi-tenant environment 106 is able to utilize a client device 102 to submit requests across at least one network 104 to at least one designated address or interface of the multi-tenant environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The multi-tenant environment 106 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, however, certain customers might want more assurance that requests received to a distributed environment are properly evaluated, such that only requests meeting certain criteria are able to access resources or services associated with that customer. Since at least some of these resources or services can be located in different regions of the distributed environment (geographically and/or logically), it can also be desirable that those criteria are enforced at any relevant locations across the distributed environment.

Figure 2:
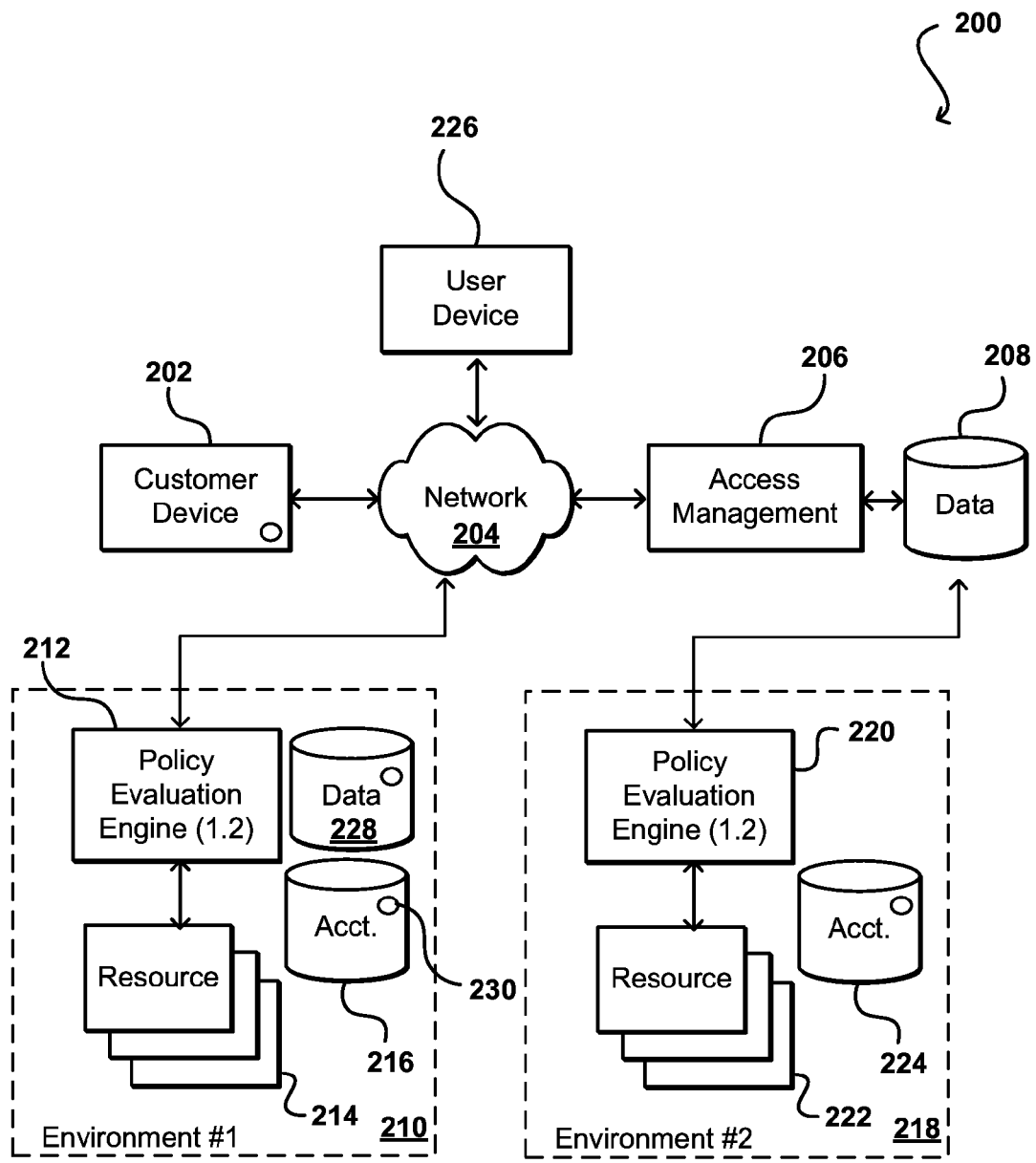
FIG. 2 illustrates an example configuration for managing multiple security policy representations that can be utilized in accordance with various embodiments.

FIG. 2 illustrates an example configuration 200 wherein a customer is able to have one or more security policies enforced at multiple locations in a distributed environment. In this example, a customer is able to use a customer device 202, such as a personal computer or other such device, to submit a security policy 230 to an access management service 206, or other such service, entity, or resource. Copies of at least a portion of the information in a security policy can be stored on the customer device 202, an accounting or other data store 216, 224, 228 of one of the environment, or in other appropriate locations. The request can be transmitted across at least one network 204, such as a local area network (LAN), the Internet, and Ethernet, a cellular network, and the like. As discussed above, the request can be received to an interface (not shown) such as an API that is able to direct the security policy to the access management service 206. The access management service 206 can be part of the distributed environment, and associated with the provider of the environment, or can be provided by a third party, etc.

The access management service 206 can receive the access policy from the customer, determine the resources and/or services associated with that customer, or an account of the customer with the provider, and can verify the contents of the policy, such as to ensure the policy complies with any policy requirements of the distributed environment, as well as the resources and/or services for which the policy is to be applied. The access management can obtain this and other such information from at least one data store 208 storing relevant data for the customer and/or the environment. Once the policy is validated, a copy of the security policy can be provided to each relevant location across the distributed environment. In this example, the security policy can be provided to each of two different sub-environments 210, 218 of the distributed environment. A copy of the security policy can be stored in a data store 216, 224 in each of the environments, to be evaluated by a respective policy evaluation engine 212, 220 for those environments. It should be understood that the data stores could be distributed, shared, and/or located within other areas of the distributed environments as well within the scope of the various embodiments. When a request is received from the client device 202 or from a user device 226 associated with a user having access rights to resources under the customer account, information for that request can be directed to the policy evaluation engine for the respective environment, which controls access to resources 214, 222 of the respective environment. If the request is received to the first environment 210, the policy evaluation engine 212 can determine the appropriate security policy using data stored in the at least one data store 216, and can evaluate the request using that policy to determine whether to allow or deny the request, among other possible options.

As mentioned, however, the security policy language used to generate the security policy can change over time. This can include a different version or representation, or even a different language, among other such options. The customer at various times might update or generate new security policies using a different representation than was previously provided. For example, a customer might provide a security policy written using version 1.2 of a given policy language, where the previous policy was written using version 1.0. In order for the new representation to be applied at least relevant location in the distributed environment, each policy evaluation engine must support (or otherwise be able to process) that representation. As illustrated in FIG. 2, however, only one 220 of policy evaluation engines supports version 1.2, as the other policy evaluation engine 212 still supports at most version 1.0. In other examples, there could be additional evaluation engines that support yet other representations. Thus, the most recently updated representation is not supported by all of the evaluation engines, such that the policy document cannot be implemented across the distributed environment, using conventional approaches, until all evaluation engines support the new representation. In some embodiments different representations can be used with different evaluation engines, but in at least some environments it can be desirable to utilize a common security policy across the environment.

Accordingly, approaches in accordance with various embodiments can perform one or more translations of a security policy document when that policy is submitted or otherwise evaluated, such as when the policy is received to an access management service 206. In at least some embodiments the access management service can include one or more translation engines that are configured to translate a security policy, written using a particular version or representation of a policy language, to a representation written in an original representation of the policy language, such as the first version or representation supported in the environment. In other embodiments, the access management service (or another such entity) can determine the most recent version or representation that is supported across the environment, and can convert the security policy to be expressed using that version or representation. In still other embodiments, the policy might be converted into multiple versions or representations, which can be distributed for engines capable of supporting those versions or representations. Various other such approaches can be utilized as well.

Using such an approach, various policy document languages can be translated into at least one document language that is supported across the distributed environment. The translation can be performed in at least some embodiments for any representation where the features are able to be supported using an earlier language version or representation, even though the constructs might be significantly more complex after translation. Such an approach enables the distributed system to support incremental changes to a policy language, and in at least some embodiments can perform the translation at approximately the time of submission. Translating a policy document can also allow legacy components in the device to continue to interoperate. Such an approach differs from version control, for example, as the policies are converted to a specific representation that is supported across the environment, which in many cases will not be the most recent version or representation. Further, the translation can be performed around the time of policy submission, as opposed to runtime as for conventional versioning approaches. Further still, updated evaluation engines do not need to be deployed to every part of the distributed environment as with conventional versioning approaches. In at least some embodiments, however, the access management service might not be able to translate one or more features supported by the new representation, such that an updated translation engine might need to be propagated out to various locations across the distributed environment. The document created through the translation might be significantly larger than the received policy document, or might only allow for a subset of the access granted through the received policy document. In some embodiments, the received document can include annotations, metadata, or other information indicating one or more guidelines or instructions for translating the document to an earlier or different representation.

Figure 3:
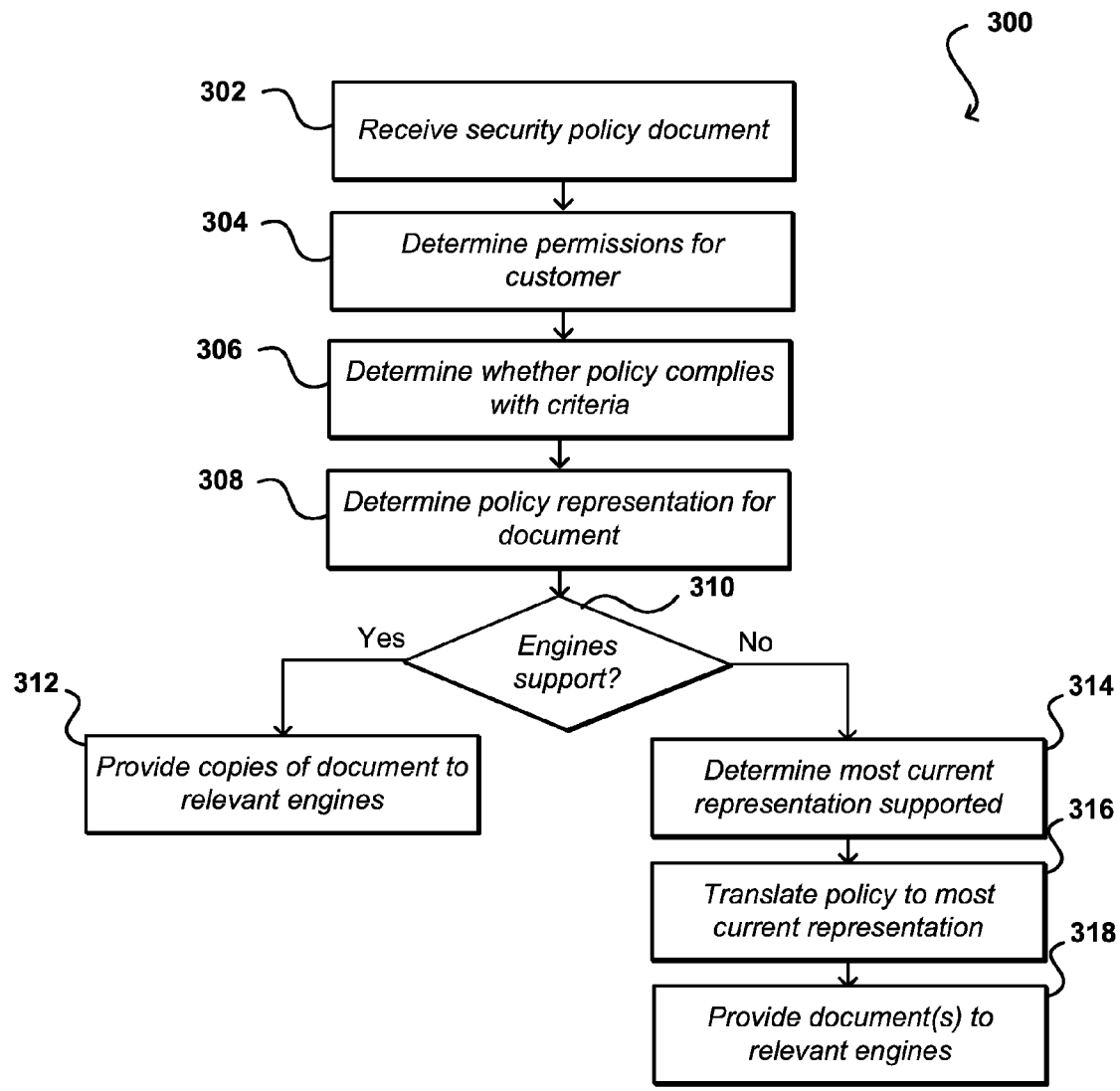
FIG. 3 illustrates a first example process for managing multiple security policy representations in a distributed environment that can be utilized in accordance with various embodiments.

FIG. 3 illustrates an example process 300 for translating security policies in a distributed environment that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a security policy is received 302 from a customer. Information for the customer can be analyzed to determine 304 one or more permissions of the customer with respect to services and/or resources provided through the distributed environment. The security policy can also be analyzed 306 to determine whether the policy meets one or more criteria for the environment, the respective resources or services, the customer account, or other such aspects. A version or other representation of a policy language used to generate the received policy can be determined 308. A determination can be made 310 as to whether any relevant evaluation engine for the resources and/or services to be associated with the security policy support that representation of the policy language. If the representation is supported, the policy can be injected or otherwise provided 312 to the appropriate locations across the distributed environment. If the representation is not supported by all the relevant evaluation engines, the most recent representation or most current version that is supported by the engines can be determined 314, and a translation of the policy can be performed 316 such that the features of the security policy are represented in the determined representation and/or version. The translated version(s) then can be propagated 318 to the appropriate locations across the environment. As discussed, the translated representation can include features that are able to be supported in the representation of the policy language to which the policy is translated. If new features are added to the policy that are unable to be supported in a representation handled by a respective evaluation engine, the evaluation engine must be upgraded to handle those features, or another such approach taken.

The policy control language in some embodiments includes an access control language that has multiple representations. These representations can include, for example, a binary machine-readable format, a domain-specific language, a standards-compliant format corresponding to a federation provider, a representation in a known language such as JSON, a representation optimized for a specific task, and so on. Thus, in addition to a base representation there can be several domain-specific representations or higher-level representations, which in at least some embodiments must be compiled or translated down to a lower or earlier representation in order to be processed by one or more evaluation engines in the environment. In at least some embodiments, an access management service can contact a target evaluation engine to determine the representations that are supported, and then translate the policy into the closest representation that supports at least some of the included features, if not all in some embodiments.

Figure 4:
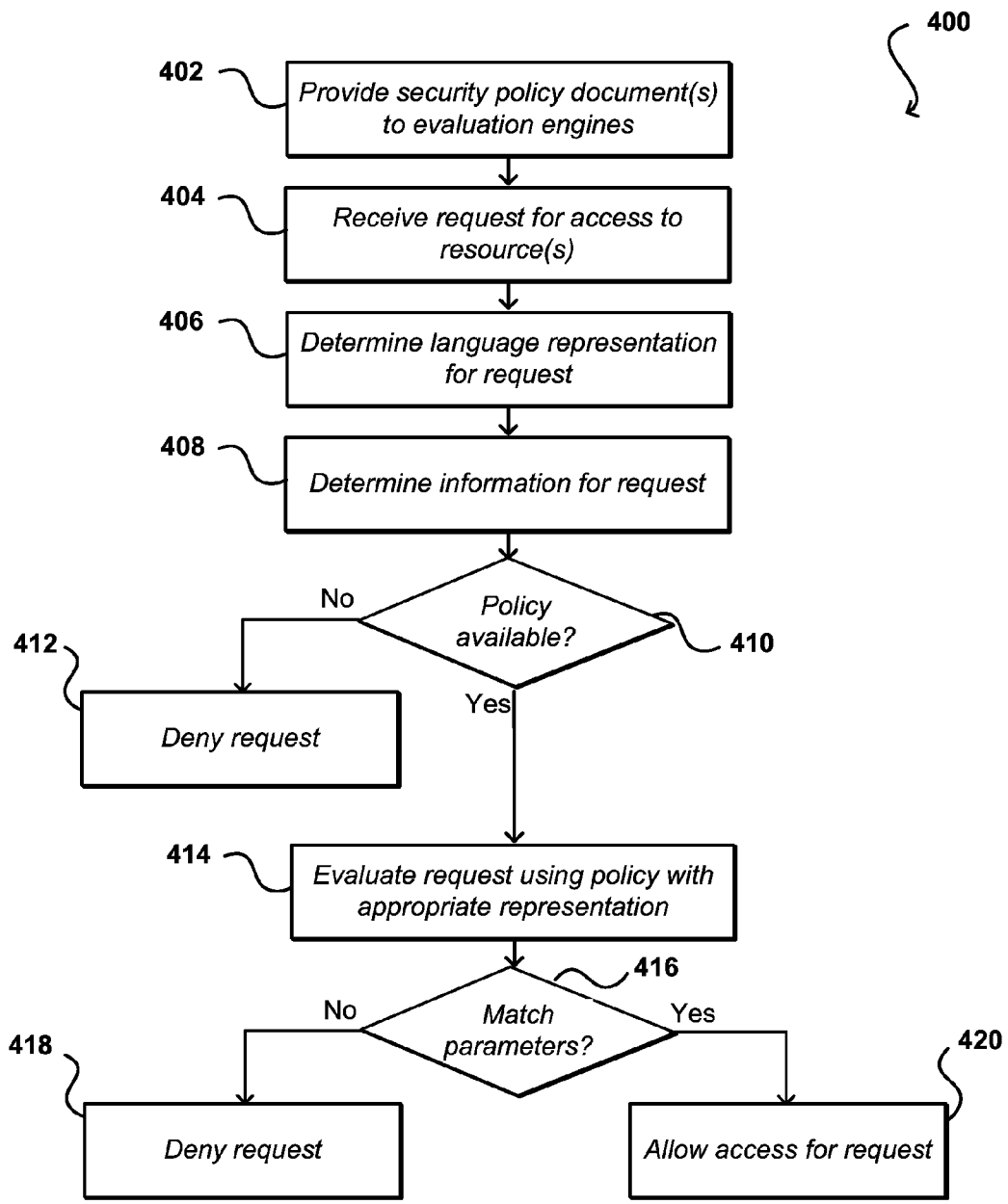
FIG. 4 illustrates a second example process for managing access to resources using multiple security policy representations in a distributed environment that can be utilized in accordance with various embodiments.

FIG. 4 illustrates an example process 400 for using multiple representations of security and/or access control policies to determine whether to allow or deny requests, which can be used in accordance with various embodiments. For each appropriate location across a distributed environment, in this example, a policy evaluation engine is provided 402 with one or more representations of each of a plurality of security policies. Each location can be associated with one or more types of resources that can leverage a policy evaluation engine, such as may include computing resources, data resources, buckets, queues, and other such resources. Each of the policies can be associated with a customer of the environment, and can indicate one or more conditions that are to be met in order to allow a request to access one or more resources of the environment that are associated with that customer, or an account of that customer. The representations can be stored in any appropriate location that is accessible to the policy evaluation engine. Subsequently, a request is received 404 to an interface of the distributed environment and information for the request is directed to the policy engine for evaluation. The policy evaluation engine can determine 406 a version or representation of the policy language associated with the request. The policy evaluation engine can also determine information 408 such as the source of the request, an identifier of a user associated with the request, information about the customer account tied to the resources for the request, or other such information. Based at least in part upon the version or representation for the request, and any relevant identifying information, a determination can be made 410 as to determine the appropriate security policy and whether a representation of the security policy that is supported by the evaluation engine is available. In at least some embodiments, this can include a parameterized matching function that analyzes various parameters to determine whether a policy representation matches the request. If no representation of the appropriate security policy is available that is supported by the evaluation engine and applies to the request, the request can be denied 412 (or otherwise handled). If such a representation does exist, the request can be evaluated 414 using at least one appropriate representation. Analyzing information for the request using the representation can enable the evaluation to determine 416 whether to allow the request. The evaluation engine can have evaluation logic for each respective core representation in at least some embodiments. Based at least in part upon the analysis, the request can be allowed 418 if at least one representation is determined to explicitly allow access, or denied 420 if none of the representations allow access. In at least some embodiments, determining to allow a request can also involve determining the type of access to grant the request, as may be based upon one or more delegation profiles specified by the customer. In such a delegation profile, a customer can grant users or requests certain types of access, which can differ for different users or types of request, for example, but will always fall within the rights granted to the customer against those resources, in at least some embodiments.

It might be the case that a customer wants to utilize a new representation of a policy with an evaluation engine, but the engine might not yet support that representation. In at least some embodiments, the customer can utilize a translation or conversion tool to accept a representation of a security policy document and an identification of the previous representation that is supported by the appropriate engine. The tool can evaluate the version or representation of the document, as well as features utilized by the document, and can determine whether the document is able to be translated into the earlier representation such that the features will still be available, although using a potentially more complex construct. If so, the other representation can be generated and the customer can provide both representations to the environment. If the translation cannot be performed while maintaining the functionality, the customer will have to decide whether to wait to implement the new representation, generate a different document in an older representation, or specify to the provider of the environment to utilize resource where the evaluation engine supports the newer representation, among other such options. In some embodiment a customer might use such a tool to purposefully create multiple representations of a policy document, such as where a standards-compliant or domain-specific representation might be needed for certain applications or services. A customer might also want to create different representations in order to control the types of functionality that can be accessed using each representation, among other such purposes.

At least some evaluation engines might utilize a logging function, whereby the engines each store information about versions or representations of requests that were received, as well as the customers or resources associated with those requests. Such information can be used by the provider to determine when it is necessary to upgrade the evaluation engine, when older representations or languages no longer need to be supported for at least certain tasks, and other such information. Logging can also include information about requests that were allowed or denied, policy document representations utilized, etc.

At least some embodiments enable a provider or other such entity to define a second policy language that is targeted at a particular audience or type of functionality. Such an approach can be provide more accessible features to a diverse set of customers via the multiple policy language representations leveraging that second policy language. Given a first policy language that is the supported language within an environment, the second policy language can be used to add additional expressiveness, syntactic sugar, and/or an alternative approach to encoding information. The translator of an access management service or other such entity then can translates policies written in the second language into valid policies within the first language. Such an approach enables defining evaluation semantics within the first language, as well as and evaluation semantics with respect to a single (and possibly less feature-rich) language while supporting additional features for customers. Additional languages can also be introduced, where the same (or a different) translator can translate the third language into either the first or second language. This translation of policy language formats can either be done statically (when the policy is uploaded), periodically, or dynamically at request time, among other such options.

Figure 5:
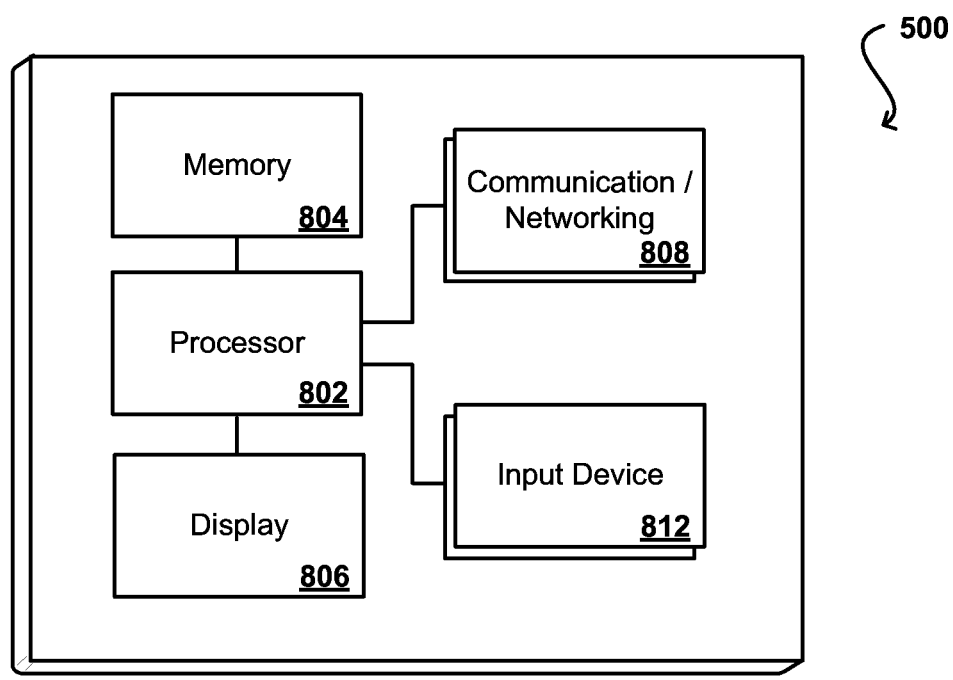
FIG. 5 illustrates a set of components of an example computing device that can be utilized in accordance with various embodiments.

FIG. 5 illustrates a logical arrangement of a set of general components of an example computing device 500 that can be utilized in accordance with various embodiments. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device may include, or be connected to, a display element 506, such as a touch screen or liquid crystal display (LCD), although devices might convey information via other means, such as through audio speakers. In some embodiments, the computing device 500 can include one or more communication components 508, such as a network interface card, Wi-Fi, Bluetooth, RF, wired, or wireless communication system. The device in many embodiments can communicate with a network, such as the Internet, and may be able to communicate with other such devices. In some embodiments the device can include at least one additional input element 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing multiple representations of a security policy in a distributed environment, comprising:

receiving a first security policy document associated with a customer of the distributed environment, the customer having access rights to one or more resources of the distributed environment, the first security policy including one or more access criteria for allowing a request to obtain access to the one or more resources;

determining a first representation of a policy language associated with the first security policy document and a second representation of the policy language supported by at least one policy evaluation engine of the distributed environment, the at least one policy evaluation engine configured to manage access to at least a portion of the one or more resources;

generating a second security policy document by translating content of the first security policy document to be expressed in the second representation of the policy language;

providing a copy of at least one of the first security policy document or the second policy document to each of the at least one policy evaluation engine;

receiving the request for access to at least a portion of the one or more resources, information for the request being directed to a respective evaluation engine for the portion of the one or more resources;

determining an appropriate security policy document for the request; and determining whether to grant access to the portion of the one or more resources, for the request, by evaluating the information for the request using the appropriate security policy document.

2. The computer-implemented method of claim 1, wherein the first representation of the policy language corresponds to a newer version of the policy language, and wherein the first security policy document is an incremental update of a previous security policy document associated with the customer and the one or more resources.

3. The computer-implemented method of claim 2, wherein the previous security policy document is associated with one of the first representation of the policy language, the second representation of the policy language, or a third representation of the policy language, the third representation corresponding to a previous version of at least the first representation of the policy language.

4. The computer-implemented method of claim 1, wherein the access to the portion of the one or more resources includes an amount of access within a scope of the access rights of the customer to the one or more resources.

5. The computer-implemented method of claim 1, further comprising:

determining the amount of access to grant for the request using at least one delegation profile specified by the customer.

6. The computer-implemented method of claim 1, wherein determining the appropriate security policy document for the request is based at least in part upon at least one of information in the request, configuration of the at least one policy evaluation engine, or information for a source of the request.

7. A system for generating multiple representations of a security policy, comprising:

at least one processor; and memory storing instructions that, when executed by the at least one processor, cause the system to:

obtain a first security policy associated with a customer of a distributed environment, the first security policy including access parameters for determining whether to allow access to one or more resources of the distributed environment to which the customer has access;

determine whether a first representation of a policy language of the first security policy is supported by each policy evaluation engine, of the distributed environment, that is associated with the one or more resources;

translate content of the security policy to a second representation of the policy language when the first representation of the policy language of the security policy is only supported by a portion of the at least one policy evaluation engines, the different representation being supported by at least one of the at least one policy evaluation engine and being used to generate a second security policy; and provide at least a portion of at least one of the first security policy or the second policy to each policy evaluation engine associated with the one or more resources.

8. The system of claim 7, wherein the instructions when executed further cause the system to:

enable the customer to request generation of the second security policy, the second security policy enabling different levels of access to the one or more resource.

9. The system of claim 7, wherein each policy evaluation engine supports at least one of the first representation or the second representation of the policy language.

10. The system of claim 7, wherein the policy language is an access control language.

11. The system of claim 7, further comprising:

an application programming interface (API) for receiving the first security policy from the customer.

12. The system of claim 7, wherein the instructions when executed further cause the system to:

determine whether the first security policy complies with one or more policy restrictions of the distributed environment, the determining being based at least in part upon information associated with an account of the customer with a provider of the distributed environment.

13. The system of claim 7, wherein the second representation of the policy language corresponds to an original version of the policy language or a previous version of the policy language.

14. The system of claim 7, wherein the instructions when executed further cause the system to:

distribute an updated version of at least one policy evaluation engine when the at least one policy engine does not support one or more features in the first version of the policy language.

15. The system of claim 7, wherein the first representation includes at least one of a domain-specific representation, a binary machine-readable representation, a standards-compliant representation corresponding to a federation provider, a representation in a specified language, or a representation optimized for a specific task using the one or more resources.

16. The system of claim 7, wherein the first representation expresses a different level of access than the second representation.

17. The system of claim 16, wherein the second representation prevents at least one type of access allowed by the first representation.

18. The system of claim 7, wherein the first representation includes one or more annotations including at least one instruction for performing a translation of the content from the first representation to the second representation.

19. A system for managing access to resources in a distributed environment, comprising:

at least one processor; and memory storing instructions that, when executed by the at least one processor, cause the system to:

receive a request for access to one or more resources in the distributed environment;

determine a representation of a security policy language associated with the request;

determine whether a policy evaluation engine, configured to determine whether to grant the request access to the one or more resources, has access to a security policy corresponding to the request, the policy evaluation engine capable of having access to a plurality of security policies, at least a portion of which correspond to a different representation of the policy language;

analyze information for the request using a corresponding security policy when the corresponding security policy is available to the policy evaluation engine and the corresponding security policy is expressed in the representation associated with the request; and grant access to the portion of the one or more resources, for the request, when information for the request complies with parameters of the corresponding security policy.

20. The system of claim 19, wherein multiple security policies, each associated with a different representation of the policy language, are determined to be associated with the request, and wherein the instructions when executed further cause the system to:

grant access to the portion of the one or more resources, for the request, when information for the request complies with parameters of at least one of the multiple security policies.

21. The system of claim 20, wherein at least one specified policy of the multiple security policies was provided by the customer, and wherein at least one other of the multiple security policies is a version of one of the at least one specified policy as translated into a different representation of the policy language.

22. The system of claim 19, wherein the instructions when executed further cause the system to:

deny access when no security policy accessible to the policy evaluation engine matches the request or the information for the request does not comply with the parameters of any security policy accessible to the policy evaluation engine.

23. The system of claim 19, wherein the information for the request includes at least information about a user associated with the request, information about the customer, or information about delegated access rights provided by the customer.

24. The system of claim 19, wherein at least one of an amount or a type of access of the customer against the one or more resources is determined by terms of an account of a customer with a provider of the distributed environment.

25. The system of claim 19, wherein the instructions when executed further cause the system to:

log information about at least one of requests received by the policy evaluation engine or security policies evaluated using the policy evaluation engine.

26. The system of claim 19, wherein at least one a representation of the security policy language is received from customer outside the distributed environment.

27. A non-transitory computer-readable storage medium including instructions that, when executed by at least one processor of a computing system, cause the computing system to:

receive a first security policy associated with a customer of a distributed environment, the first security policy including access parameters for determining whether to allow access to one or more resources of the distributed environment to which the customer has access;

determine whether a first representation of a policy language of the first security policy is supported by each policy evaluation engine, of the distributed environment, that is associated with the one or more resources;

translate content of the security policy to a second representation of the policy language when the first representation of the policy language of the security policy is only supported by a portion of the at least one policy evaluation engine, the different representation being supported by at least one of the at least one policy engine and being used to generate a second security policy; and provide at least a portion of at least one of the first security policy or the second policy to one or more policy evaluation engines associated with the one or more resources.

28. The non-transitory computer-readable storage medium of claim 27, wherein the first representation of the policy language corresponds to a newer version of the policy language, and wherein the first security policy is an incremental update of a previous security policy associated with the customer and the one or more resources.

29. The non-transitory computer-readable storage medium of claim 28, wherein the previous security policy is associated with one of the first representation of the policy language, the second representation of the policy language, or a third representation of the policy language, the third representation corresponding to a previous version of at least the first representation of the policy language.

30. The non-transitory computer-readable storage medium of claim 27, wherein the instructions when executed further cause the computing system to:

distribute an updated one policy evaluation engine when the at least one policy engine does not support one or more features in the first version of the policy language.

* * * * *